(12) United States Patent
Appuhamillage et al.

(10) Patent No.: US 9,063,032 B2
(45) Date of Patent: Jun. 23, 2015

(54) SIGNAL MONITORING SYSTEM FOR MONITORING STRAIN APPLIED TO A COMPOSITE COMPONENT

(75) Inventors: Gayan Chanaka Kahandawa Appuhamillage, Kearneys Spring (AU); Jayantha Epaarachchi, Middle Ridge (AU); Hao Wang, Middle Park (AU)

(73) Assignee: The Boeing Company, Chicago, IL (US)

( * ) Notice: Subject to any disclaimer, the term of this patent is extended or adjusted under 35 U.S.C. 154(b) by 423 days.

(21) Appl. No.: 13/441,064

(22) Filed: Apr. 6, 2012

(65) Prior Publication Data
US 2013/0268471 A1  Oct. 10, 2013
US 2014/0304203 A2  Oct. 9, 2014

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G01B 5/30 | (2006.01) |
| G01B 7/16 | (2006.01) |
| G01L 1/00 | (2006.01) |
| G01N 3/00 | (2006.01) |
| G01M 11/08 | (2006.01) |
| G06N 3/04 | (2006.01) |
| G01L 1/24 | (2006.01) |

(52) U.S. Cl.
CPC ............. *G01M 11/083* (2013.01); *G06N 3/049* (2013.01); *G01L 1/246* (2013.01)

(58) Field of Classification Search
None
See application file for complete search history.

(56) References Cited

U.S. PATENT DOCUMENTS

| | | | |
|---|---|---|---|
| 5,909,295 A | 6/1999 | Li et al. | |
| 6,067,391 A | 5/2000 | Land | |
| 6,555,945 B1 | 4/2003 | Baughman et al. | |
| 6,647,160 B1 * | 11/2003 | Chi et al. | 385/12 |
| 6,691,007 B2 | 2/2004 | Haugse et al. | |
| 6,768,827 B2 | 7/2004 | Yoo | |
| 7,603,004 B2 * | 10/2009 | Dua et al. | 385/12 |
| 7,957,645 B1 | 6/2011 | Stevens et al. | |
| 7,962,036 B1 | 6/2011 | Uhlhorn et al. | |
| 2003/0133641 A1 | 7/2003 | Yoo | |
| 2004/0126057 A1 | 7/2004 | Yoo | |
| 2005/0067559 A1 * | 3/2005 | Ogisu et al. | 250/227.14 |
| 2007/0297714 A1 | 12/2007 | Dua et al. | |
| 2008/0106745 A1 * | 5/2008 | Haber et al. | 356/519 |
| 2010/0149073 A1 | 6/2010 | Chaum et al. | |

(Continued)

OTHER PUBLICATIONS

Geernaert et al., WO 2011/060817 A1.*

(Continued)

*Primary Examiner* — Kakali Chaki
*Assistant Examiner* — Daniel Pellett
(74) *Attorney, Agent, or Firm* — Armstrong Teasdale LLP (57) ABSTRACT

A system for estimating a strain of a component and method of estimating strain is provided. The system includes a signal generator configured to transmit a signal toward the component. A sensor is coupled to the component and configured to receive the signal and to generate a reflected signal. The system includes a fiber Bragg grating filter coupled to the sensor and configured to filter the reflected signal and to generate a filtered signal. A detector is coupled to the filter and configured to convert the filtered signal to a time domain signal. The system includes an artificial neural network coupled to the detector and configured to process the time domain signal to facilitate estimating the strain of the component.

19 Claims, 8 Drawing Sheets

(56) References Cited

U.S. PATENT DOCUMENTS

2011/0044577 A1* 2/2011 Gupta et al. .................. 385/13
2011/0121076 A1 5/2011 Hennick et al.

OTHER PUBLICATIONS

Melle, Serge M., et al. "A Bragg grating-tuned fiber laser strain sensor system." Photonics Technology Letters, IEEE 5.2 (1993): 263-266.*
Nunes, L. C. S., L. C. G. Valente, and A. M. B. Braga. "Analysis of a demodulation system for Fiber Bragg Grating sensors using two fixed filters." Optics and Lasers in Engineering 42.5 (2004): 529-542.*
Jian, Zhang, Zhao Hong, and Rong Xian-wei. "Application of BP neural network in FBG sensing system performance improvement." 2008 International Conference on Electronic Packaging Technology & High Density Packaging. 2008.*
Negri, Lucas, et al. "Benchmark for peak detection algorithms in fiber Bragg grating interrogation and a new neural network for its performance improvement." Sensors 11.4 (2011):3466-3482.*
Zhaoxia, Wu, et al. "Distributed fiber grating spectrum optimization based on BP neural network." Internet Computing & Information Services (ICICIS), 2011 International Conference on. IEEE, 2011.*
Encinas, Leonardo S., Antonio C. Zimmermann, and Celso LN Veiga. "Fiber Bragg Grating signal processing using artificial neural networks, an extended measuring range analysis." Microwave and Optoelectronics Conference, 2007. IMOC 2007. SBMO/IEEE MTT-S International. IEEE, 2007.*
Rostami, A., and A. Yazdanpanah-Goharrizi. "Identification of complex Bragg gratings (Apodized and chirped) using artificial neural networks (ANN)(inverse problem and ANN)." Microwave Conference, 2006. APMC 2006. Asia-Pacific. IEEE, 2006.*
Lewis, E., et al. "Principal component analysis and artificial neural network based approach to analysing optical fibre sensors signals." Sensors and Actuators A: Physical 136.1 (2007): 28-38.*
Lopes, Paulo André Menezes, Herbert Martins Gomes, and Armando Miguel Awruch. "Reliability analysis of laminated composite structures using finite elements and neural networks." Composite Structures 92.7 (2010): 1603-1613.*
Zimmermann, Antonio Carlos, C. Veiga, and Leonardo Soliz Encinas. "Unambiguous Signal Processing and Measuring Range Extension for Fiber Bragg Gratings Sensors Using Artificial Neural Networks—A Temperature Case." Sensors Journal, IEEE 8.7 (2008): 1229-1235.*
King, D., et al. "An optical fibre ethanol concentration sensor utilizing Fourier transform signal processing analysis and artificial neural network pattern recognition." Journal of Optics A: Pure and Applied Optics 5.4 (2003): S69.*
Chou, P. C., H A. Haus, and J. F. Brennan III. "Reconfigurable time-domain spectral shaping of an optical pulse stretched by a fiber Bragg grating." Optics letters 25.8 (2000): 524-526.*
Husdi, Irwan Rawal, Kentaro Nakamura, and Sadayuki Ueha. "Sensing characteristics of plastic optical fibres measured by optical time-domain reflectometry." Measurement Science and Technology 15.8 (2004): 1553.*
Panopoulou, A., et al. "Dynamic fiber Bragg gratings based health monitoring system of composite aerospace structures." Acta Astronautica 69.7 (2011): 445-457.*
Lopes et al., "Hybrid Learning in a Multi Neural Network Architecture", Proceedings of international joint conference on neural networks, Washington DC, USA, 2001 (pp. 2788-2793).
Nunes et al., "Analysis of a demodulation system for Fiber Bragg Grating sensors using two fixed filters," Optics and Lasers in Engineering vol. 42 (2004) (pp. 529-542).

Nunes et al., "FBG sensor multiplexing system based on the TDM and fixed filters approach", Sensors and Actuators A vol. 138 (2007) (pp. 341-349).
Zimmermann et al., "Unambiguous Signal Processing and Measuring Range Extension for Fiber Bragg Gratings Sensors Using Artificial Neural Networks—A Temperature Case", IEEE Sensors Journal, vol. 8, No. 7, Jul. 2008 (pp. 1229-1235).
Lopes et al., "Reliability analysis of laminated composite structures using finite elements and neural networks", Composite Structures vol. 92 (2010) (pp. 1603-1613).
Lewis et al., "Principal component analysis and artificial neural network based approach to analysing optical fibre sensors signals", Sensors and Actuators A vol. 136 (2007) (pp. 28-38).
Kahandawa et al., "An investigation of spectral response of embedded Fibre Bragg Grating (FGB) sensors in a hollow composite cylindrical beam under pure torsion and combined loading", 6th Australasian Congress on Applied Mechanics, ACAM 6, Dec. 12-15, 2010, Perth, Australia (10 pgs).
Kahandawa et al., "Effects of the self distortions of embedded FBG sensors on spectral response due to torsional and combined loads", Asia-Pacific Workshop on Structural Health Monitoring (APWSHM2010), Nov. 30-Dec. 2, 2010, The University of Tokyo, Tokyo, Japan (10 pgs).
Sorensen et al., "Delamination detection and characterisation of bridging tractions using long FBG optical sensors", Composites: Part A, vol. 38 (2007) (pp. 2087-2096).
Epaarachchi et al., "Investigation of embedded Near Infrared Fibre Bragg Grating (FBG) sensors (830 nm) in structural health monitoring of glass fibre composite structures", Proceedings of Conference, Optical Fibre Sensors, Perth, Australia (5 pgs).
Lee et al., "Failure of carbon/epoxy composite tubes under combined axial and torsional loading: 1. Experimental results and prediction of biaxial strength by the use of neural networks", Composites Science and Technology, vol. 59, (1999) (pp. 1779-1788).
McCartney, L.N.,"Prediction of ply crack formation and failure in laminates", Composites Science and Technology, vol. 62 (2002) (pp. 1619-1931).
McCartney, L.N., "Predicting transverse crack formation in cross-ply laminates", Composites Science and Technology, vol. 58 (1998) (pp. 1069-1081).
Reifsnider, K., "Fatigue behavior of composite materials", International Journal of Fracture, vol. 16, No. 6, Dec. 1980 (pp. 563-583).
Epaarachchi et al., "An experimental investigation of the properties of cross-ply laminate used for manufacturing of small aircraft components", Composite Structures, vol. 75 (2006) (pp. 93-99).
Takeda et al., "Monitoring of Delamination Growth in CFRP Laminates using Chirped FBG Sensors", Journal of Intelligent Material Systems and Structures, vol. 19, No. 4, (pp. 437-444).
Okabe et al., "Application of chirped fiber Bragg grating sensors for identification of crack locations in composites", Composites: Part A, vol. 35 (2004) (pp. 59-65).
Takeda et al., "Delamination detection in CFRP laminates with embedded small-diameter fiber Bragg grating sensors", Composites: Part A, vol. 33 (2002) (pp. 971-980).
International Preliminary Report on Patentability of International Application No. PCT/US2013/021977; Oct. 16, 2014; 9 pages.
Encinas, L. et al.; Fiber Bragg Signal Processing Using Artificial Neural Networks, and Extended Measuring Range Analysis; IEEE; Microwave and Optoelectronics Conference; Oct. 29, 2007; pp. 671-674.

* cited by examiner

SIGNAL MONITORING SYSTEM FOR MONITORING STRAIN APPLIED TO A COMPOSITE COMPONENT

BACKGROUND OF THE INVENTION

The present disclosure relates generally to signal monitoring systems, and more particularly, to a signal monitoring system utilized to monitor strain applied to a composite component.

Composite materials are used in engineering applications for a wide range of structural components. Composite materials have advantages over structures fabricated from other materials such as, but not limited to, a superior weight-to-strength ratio, convenient fabrication for complex shapes and the ability to vary material properties to suit specific applications. Some composite materials, however, may have disadvantages associated with repair costs and/or degradation of strength, based on over-exposure to heat, humidity, and ultraviolet environments. Because of such disadvantages, structures such as vehicles may use an integrated structural health monitoring (SHM) system to monitor the composite components in some applications.

Some SHM systems may identify failure modes of composite materials due to, for example, loads applied to the composite component. Conventional monitoring systems may use embedded sensors within the composite component to monitor the strain induced in the composite component. Some embedded sensors include strain gauges and displacement transducers. The spectral response for such embedded sensors, however, can be adversely affected by multi-axial loading conditions, by the fiber orientation, and by the type of load applied to the composite component. Moreover, some sensors embedded between non-parallel fiber layers may create significant distortions in the spectral response when subjected to torque.

Some current systems that use embedded sensors to detect strain may use an optical spectrum analyzer (OSA) to interpret the reflected light spectrum from the sensors. However, some OSA devices are expensive and may not be sufficiently robust to be embedded in the dynamic components of machinery. Moreover, other factors, such as micro-bending due to laminate configurations within the composite component, may cause significant distortions on the reflected spectrum of the sensor. Because of the distortions of the reflected spectrum, determining strain with an OSA from the reflected spectrum may be difficult. Moreover, the processing required by the OSA to interpret the reflected spectrum can be processor intensive.

Damage of the composite component can be difficult to categorize. The reflected spectrum from the embedded sensors, as measured by the OSA device, can be used to determine strain and/or damage and may be a function of subjective personal judgment based on historical data from various loading experiments and related stress field mapping techniques. In at least some known processes, the strain may be simply calculated using the location of the maximum peak of the reflected spectrum of the embedded sensor. However, such a calculation approach may not be indicative of the actual damage within the composite component.

BRIEF DESCRIPTION OF THE INVENTION

In one aspect, a system for estimating strain of a component is provided. The system includes a signal generator configured to transmit a signal toward the component. A sensor is coupled to the component and configured to receive the signal and to generate a reflected signal. The system includes a fiber Bragg grating filter coupled to the sensor and configured to filter the reflected signal and to generate a filtered signal. A detector is coupled to the filter and configured to convert the filtered signal to a time domain signal. The system includes an artificial neural network coupled to the detector and configured to process the time domain signal to facilitate estimating the strain of the component.

In another aspect, a method of estimating strain of a component is provided. The method includes transmitting an optical signal from a laser into a fiber Bragg grating sensor and transforming the transmitted optical signal into a reflected signal. The method includes directing the reflected signal into a plurality of fiber Bragg grating filters and filtering the reflected signal into a plurality of filtered signals. The plurality of filtered signals is directed into a plurality of photo-detectors. The method includes converting the plurality of filtered signals into a plurality of time domain signals and directing the plurality of time domain signals into an artificial neural network. The method also includes analyzing the plurality of time domain signals to facilitate estimating the strain of the component.

In a further aspect, a vehicle monitoring system for monitoring the condition of a composite component of a vehicle is provided. The system includes a laser configured to transmit an optical signal toward the composite component. The system also includes a fiber Bragg grating sensor coupled to the composite component and configured to receive the optical signal and to generate a reflected signal. A fiber Bragg grating filter is coupled to the sensor and configured to filter the reflected signal and to generate a filtered signal. A photo-detector is coupled to the filter and configured to convert the filtered signal into a time domain signal. The system includes a data acquisition unit coupled to the photo-detector and configured to compile the time domain signal. The method further includes an artificial neural network coupled to the data acquisition unit and configured to analyze the time domain signal to facilitate estimating the strain of the composite component.

The features, functions, and advantages that have been discussed can be achieved independently in various embodiments or may be combined in yet other embodiments further details of which can be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION OF THE INVENTION

The embodiments described herein relate to a resilient monitoring system and methods of operating the monitoring system. More particularly, the embodiments relate to a system for monitoring structural components, which are difficult to access for inspection purposes, for detecting strain and/or damage of the structural component. Moreover, the monitoring system is utilized in a variety of environments such as, but not limited to, military, civil, industrial, rail, shipping, aerodynamic and consumer environments. In one application, the monitoring system described herein is utilized with a composite component of a vehicle. It should be understood that the description and figures that utilize vehicle composite components are exemplary only. Moreover, it should be understood that vehicle can include, but is not limited to, an aircraft, spacecraft, launch vehicle, seaborne or undersea vessel, or ground-based vehicle.

Figure 1:
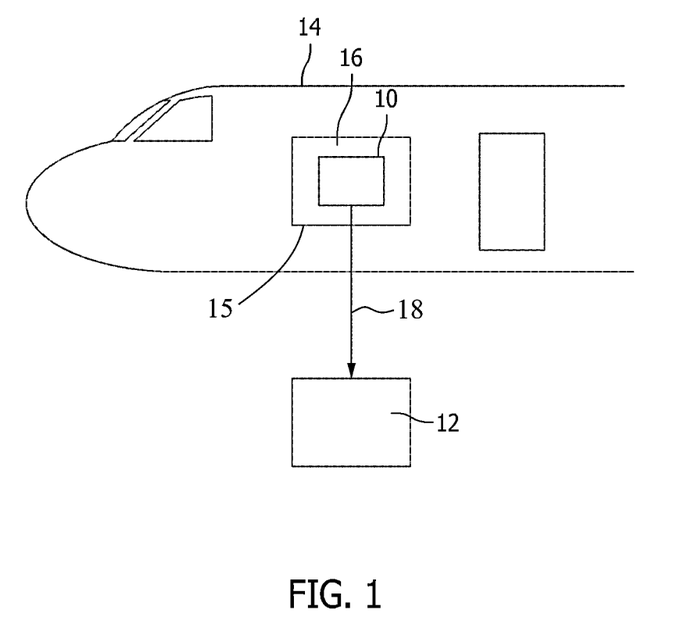
FIG. 1 illustrates a block diagram of an exemplary sensor and monitoring system coupled to a vehicle.

FIG. 1 illustrates a block diagram of an exemplary sensor 10 and exemplary monitoring system 12 coupled to a vehicle 14. More particularly, sensor 10 is coupled to a component of vehicle 14 and electrically and/or optically coupled to monitoring system 12. Sensor 10 is configured to generate electrical and/or optical signals 18 that indicate a condition of component 16 in which sensor 10 is designed to detect. In the exemplary embodiment, component 16 includes a composite component of vehicle 14 with sensor 10 embedded within and/or attached to a surface 15 of composite component 16. More particularly, sensor 10 is coupled to composite component 16 that is positioned in an inaccessible and/or hidden location of vehicle 14 that would require physical deconstruction of vehicle 14 for condition inspection to be completed using known inspection methods.

In the exemplary embodiment, sensor 10 includes a fiber Bragg grating sensor that is configured to detect strain 20 of composite component 16. Alternatively, sensor 10 may include any suitable micro-electromechanical devices, and/or extrinsic Fabry-Perot interferometric devices and/or long-period grating devices. Moreover, sensor 10 may include corrosion, humidity, pH, chloride ion, metal ion, temperature, acceleration, stress, pressure, load, and force sensors. In the exemplary embodiment, sensor 10 is tolerant and/or immune to the effects of temperature, electromagnetic interference (EMI), and/or corrosive environments. Any type of sensor configuration to determine a condition of composite component 16 may be used to enable monitoring system 12 to function as described herein.

Figure 2:
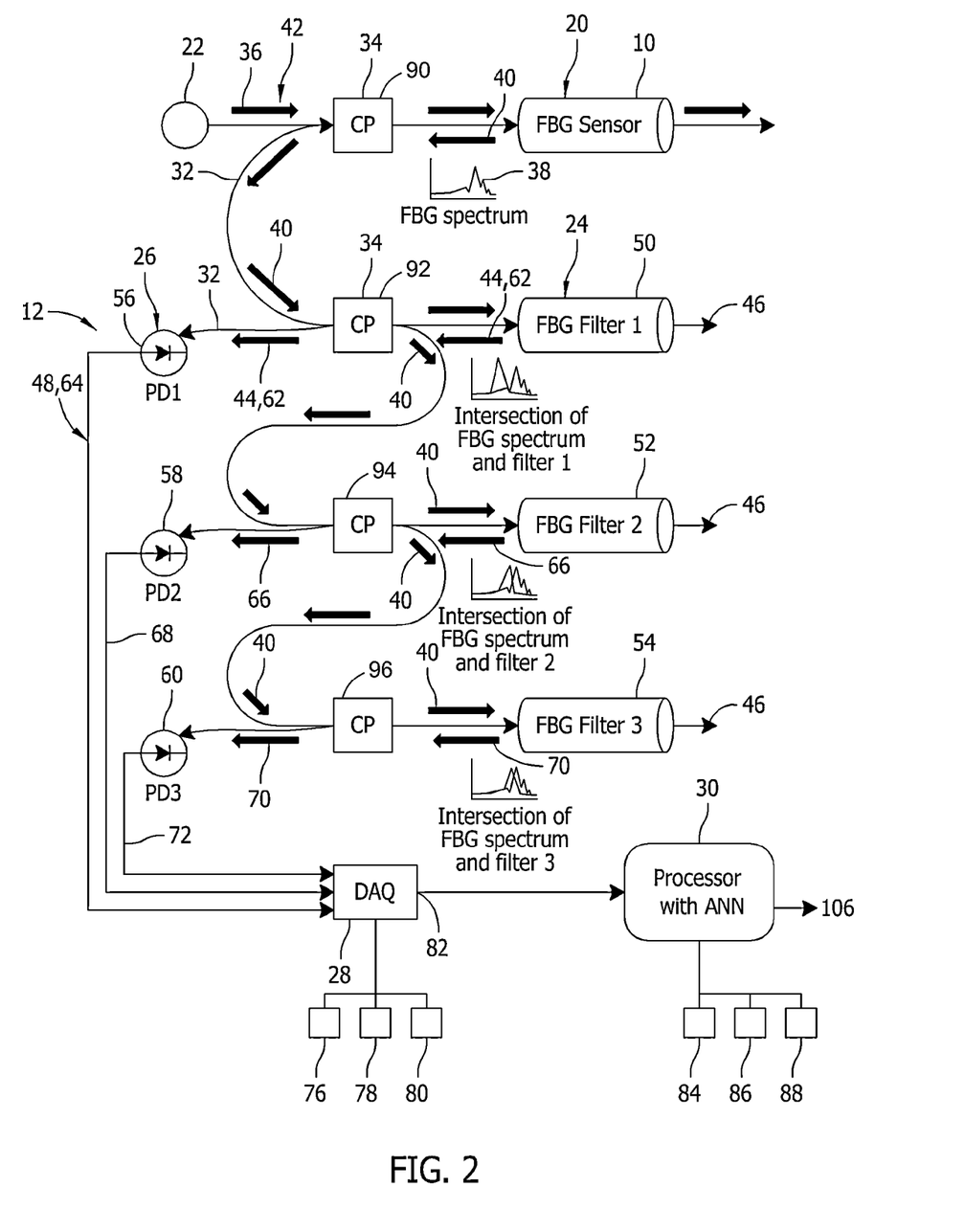
FIG. 2 illustrates a schematic view of the sensor and exemplary monitoring system shown in FIG. 1.
Figure 3:
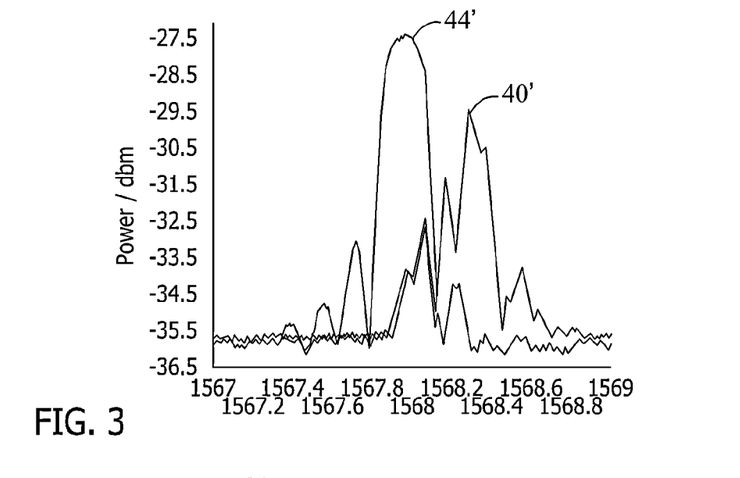
FIG. 3 illustrates an exemplary graphical representation of sensor data and filter data of the monitoring system shown in FIG. 2.

FIG. 2 illustrates a schematic view of monitoring system 12 coupled to sensor 10. FIG. 3 illustrates an exemplary graphical representation of sensor data and filter data of monitoring system 12. Monitoring system 12 includes a signal generator 22, a filter 24, a detector 26, a data acquisition unit 28, and a processor 30 with an artificial neural network. Monitoring system 12 further includes a fiber optic cable 32 and fiber coupler 34 configured to couple components of monitoring system 12 as described herein. Monitoring system 12 is configured to receive data from sensor 10 to facilitate estimating strain 20 and/or damage and/or life estimation of composite component 16.

Signal generator 22 includes a laser configured to generate and transmit an optical signal 36 toward sensor 10. Sensor 10 is configured to receive optical signal 36 and to generate signal 18 such as a spectrum response 38 which is the reflected signal 40 with at least one wavelength of reflected signal 40 (graphically illustrated as 40' in FIG. 3) being spread and/or distorted based on a strain 20 applied to sensor 10. More particularly, when composite component 16 is strained, sensor 10 is stretched and/or compressed and/or distorted. In the exemplary embodiment, wavelengths 42 of optical signal 36 are transmitted to sensor 10, such that sensor 10 is configured to reflect a pre-determined band of the wavelengths of optical signal 36 to filter 24. Sensor 10 is configured to shift the wavelengths of light that returns as reflected signal 40 to filter 24. By determining the shift of the wavelength of reflected signal 40, strain 20 of composite component 16 is estimated and/or determined by artificial neural network 30 as described herein.

In the exemplary embodiment, fiber optic coupler 34 couples filter 24 to sensor 10. Alternatively, any coupling mechanism can be used to connect filter 24 to sensor 10. Filter 24 is configured to receive and filter reflected signal 40 and to facilitate generating a filtered signal 44 (graphically illustrated as 44' in FIG. 3). In the exemplary embodiment, filter 24 includes a fiber Bragg grating filter. More particularly, filter 24 reflects a desired wavelength of light as filtered signal 44 and transmits selected other wavelengths through as signals 46. Filter 24 is configured to create a periodic variation in the refractive index of the fiber core, which generates a wavelength specific dielectric mirror (not shown) to facilitate blocking and/or reflecting certain wavelengths.

Detector 26 is coupled to filter 24 by fiber coupler 34 and fiber optic cable 32. Detector 26 is configured to receive filtered optical signal 36 and generate a time domain signal 48 representing an amount of filtered signal 44 received. In the exemplary embodiment, detector 26 includes a photo-detector which is configured to convert light of filtered signal 44 into at least current and voltage. In one embodiment, time domain signal 48 includes a voltage output that is proportional to an amount of filtered signal 44 received.

In the exemplary embodiment, filter 24 includes a first filter 50, a second filter 52, and a third filter 54. Filters 50, 52, and 54 are coupled to sensor 10 by fiber optic cable 32 and coupler 34. Filters 50, 52, and 54 are selectably designed to reflect different wavelengths to generate a plurality of filtered signals 44. In one embodiment, the plurality of filtered signals 44 includes different wavelengths. Alternatively, the plurality of filtered signals 44 may include same and/or similar wavelengths. Moreover, detector 26 includes a first detector 56, a second detector 58, and a third detector 60. Detectors 56, 58, and 60 are coupled to respective filters by fiber optic cable 32 and coupler 34. Filters 50, 52, and 54 are configured to capture sensor reflection in different strain values of composite component 16. In the exemplary embodiment, filter configurations are based on the effective operating range of sensor 10, for an example a high strain range when signal distortion is high. A number of filters 24 may be equal to a number of detectors 26 or less than a number of the detectors 26. Alternatively, any number of filters 24 and an equal number of detectors 26 can be used that enables monitoring system 12 to function as described herein.

First filter 50 is configured to receive reflected signal 40 from sensor 10 and filter reflected signal 40 to facilitate generating a first filtered signal 62. First detector 56 is configured to receive first reflected signal 44 to facilitate generating a first time domain signal 64. Second filter 52 is configured to receive reflected signal 40 from sensor 10 and filter reflected signal 40 to facilitate generating a second filtered signal 66. Second detector 58 is configured to receive second reflected signal 66 to facilitate generating a second time domain signal 68. Third filter 54 is configured to receive reflected signal 40 from sensor 10 and filter reflected signal 40 to facilitate generating a third filtered signal 70. Third detector 60 is configured to receive third reflected signal 70 to facilitate generating a third time domain signal 72. Fiber optic cables 32 and couplers 34 are configured to channel reflected signal 40 to filters 50, 52, and 54 and are configured to channel filtered signals 44 to detectors 56, 58, and 60.

Data acquisition unit 28 is coupled to detectors 56, 58, and 60 and is configured to receive time domain signals 64, 68, and 72. Moreover, data acquisition unit 28 is coupled to processor/artificial neural network 30. Data acquisition unit 28 is configured to perform preprocessing of received timed domain signals 64, 68, and 72 based on the type of signal received. In one embodiment, an electrical or wireless connection couples data acquisition unit 28 and artificial neural network 30 to transmit signals 64, 68, and 72 from data acquisition unit 28 to artificial neural network 30.

Data acquisition unit 28 includes a plurality of digital signal processing algorithms 76 which are configured to perform functions such as, but not limited to, filtering and data compression, power-time integration, and power spectral density calculations. Data acquisition unit 28 includes at least a signal processor 78 and a memory 80. Processor 78 processes the signals 64, 68, and 72 received from detectors 56, 58, and 60 in accordance with algorithms 76 to generate digital data and stores the digital data in the memory 80. Data acquisition unit 28 includes an interface 82 that is configured to allow a connection to artificial neural network 30 and/or various computer or data downloading serial port devices (not shown), such as personal data assistants, laptop computers, or a direct or wireless connection to artificial neural network 30. Alternatively, other interface devices can be used to allow data acquisition unit 28 to transmit data to artificial neural network 30.

Artificial neural network 30 includes a plurality of diagnostic and prognostics algorithms 84 that assess the current condition state of composite component 16 to diagnose composite component 16 for conditions such as fatigue life and usage, overload conditions, and/or environmental exposures, and to predict the condition at some future time given some assumed loading, usage, scenario, and/or environmental exposure. Prognostics algorithms 84 can include crack growth or strain-life models, corrosion damage predictive models, and/or other residual strength and life predictive models. Artificial neural network 30 is configured to store the data in a format specified by vehicle maintenance personnel for planning future maintenance actions. After artificial neural network 30 is coupled to data acquisition unit 28, signal processor 78 is configured to retrieve the stored digital data from memory 80 based on requests from artificial neural network 30. Artificial neural network 30 is configured to receive data relating to time domain signals 64, 68, and 72 from detectors 56, 58, and 60 and estimate strain 20 on composite component 16.

Artificial neural network 30 is configured to analyze the behavior of operational conditions of composite component 16 to facilitate modeling non-linear characteristics of composite component 16. Although some aspects of non-linearity associated with physical components can be modeled mathematically to a certain degree, some aspects may not be amenable to a mathematical model. Artificial neural network 30 is configured to provide results when data is not provided during a training process. Artificial neural network 30 includes architectures 86 such as, but not limited to, multi-layer perception architecture having a back-propagation algorithm 88.

In the exemplary embodiment, artificial neural network 30 includes $N_I$ inputs and $N_o$ outputs. Given an input vector $x \in R^{NI}$ and an output vector $y \in R^{No}$, the output of a given neuron $k(y_j k^1 p)$ with N input connections when a pattern p is presented to artificial neural network 30 is given as a function of its activation ($a_k^p$) shown in equation (1).

$$y_k^p = F_k(a_k^p) = F_k\left(\sum_{j=1}^{N} w_{jk} y_j^p + \theta_k\right) \quad (1)$$

Where $F_k$ is the activation function of the neuron k, $w_{jk}$ represents the weight associated to the connection between neuron j and neuron k, $y_j^p$ is the output of neuron j and $\theta_k$ is the bias. Note that in the case of the input layer $y_j^p$ is equal to $x_j^p$. The gradient descent rule (BP) minimizes the quadratic error function to equation (2).

$$E^p = \frac{1}{2}\sum_{o=1}^{No} (d_o^p - y_o^p)^2 \quad (2)$$

Where $d_o^p$ is the desired output when the pattern p is presented to the network and $y_o^p$ is the neuron output. Following the minimization process, artificial neural network 30 weights are adjusted by equation (3).

$$\Delta_p w_{jk} = \gamma \delta_k^p y_j^p + \alpha \Delta_q w_{jk} \quad (3)$$

Where $\gamma$ is the learning rate, $\delta_k^p$ the local gradient of neuron k, $\Delta_q w_{jk}$ is the change made to the weight $w_{jk}$ when the last pattern q was presented to artificial neural network 30 and $\alpha$ is the momentum term.

Figure 4:
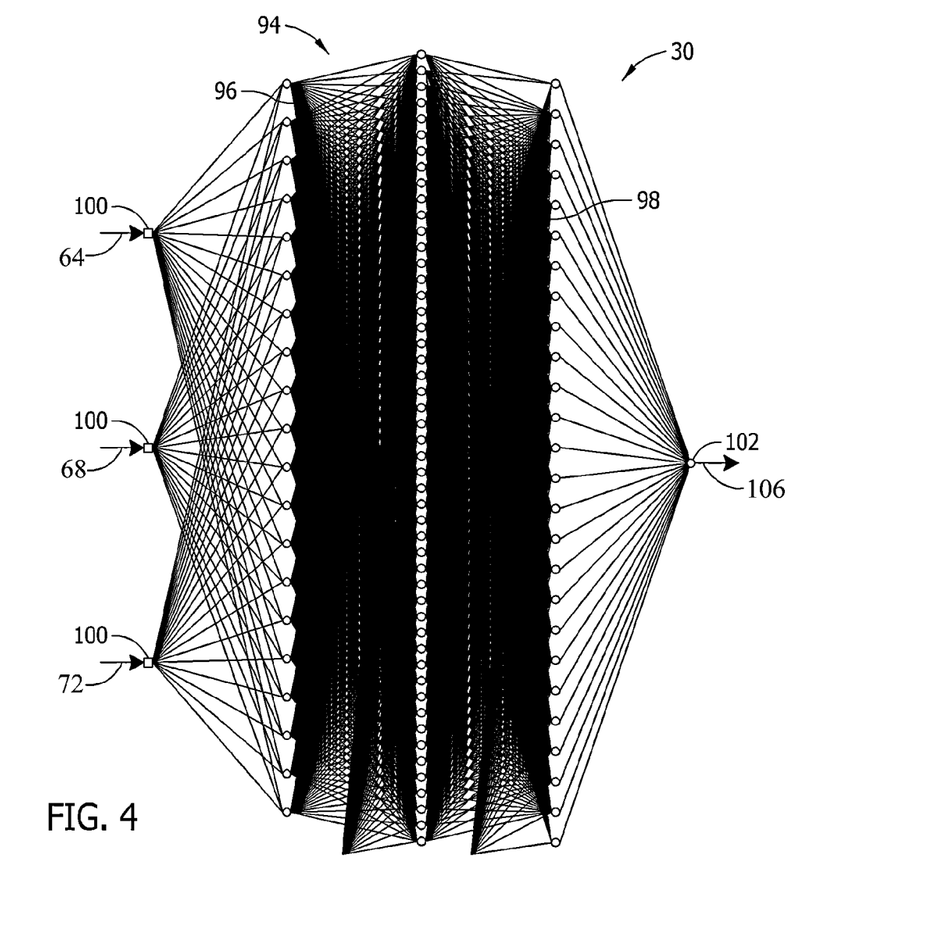
FIG. 4 illustrates an exemplary graphical representation of an exemplary artificial neural network that may be used with the monitoring system shown in FIG. 2.

FIG. 4 illustrates an exemplary graphical representation of artificial neural network 30. In the exemplary embodiment, artificial neural network 30 includes a two layer network 94 having hidden layers 96 and an output layer 98. Alternatively, any number of hidden and output layers 96 and 98 may be used to enable artificial neural network 30 to function as described herein. Moreover, artificial neural network 30 includes three input neurons 100 and one output neuron 102. Alternatively, any number of input neurons 100 and output neurons 102 may be used to enable artificial neural network 30 to function as described herein. In the exemplary embodiment, artificial neural network 30 includes three hidden layers 96, having 20, 50, and 25 neurons, and output layer 98. In the exemplary embodiment, three pre-processed fixed filter signals 62, 66, and 70 (shown in FIG. 2), detected by detectors 56, 58, and 60, are delivered to artificial neural network 30 via signals 64, 68, and 72 to three input neurons 100 and strain 20 at sensor 10 is estimated and/or predicted and/or calculated through output neuron 102.

Artificial neural network 30 is trained for the initial conditions of composite component 16 and the expected load to be applied to composite component 16. In the exemplary embodiment, back propagation algorithm 88 (shown in FIG. 2) is configured to train artificial neural network 30. The induced distortions to reflected signal 40 are set as the reference normal condition, wherein the reference is used to identify strain 20 applied to composite component 16. Moreover, artificial neural network 30 is configured to determine and/or calculate a strain output value 106 (shown in FIG. 2) based on estimated strain 20 of composite component 16. More particularly, artificial neural network 30 is configured to process the information received and, based on training, provide a strain analysis while taking into consideration noise such as, but not limited to, signal losses, filter variations, and detector variations. Moreover, artificial neural network 30 is configured to generate a user-defined category (e.g., severe, moderate, or mild)(not shown), for classification of the damage that may have resulted from the strain 20, or the like. Artificial neural network 30 is configured to generate an action response plan and/or maintenance plan and/or monitoring plan (not shown) based on estimated strain 20.

Figure 5:
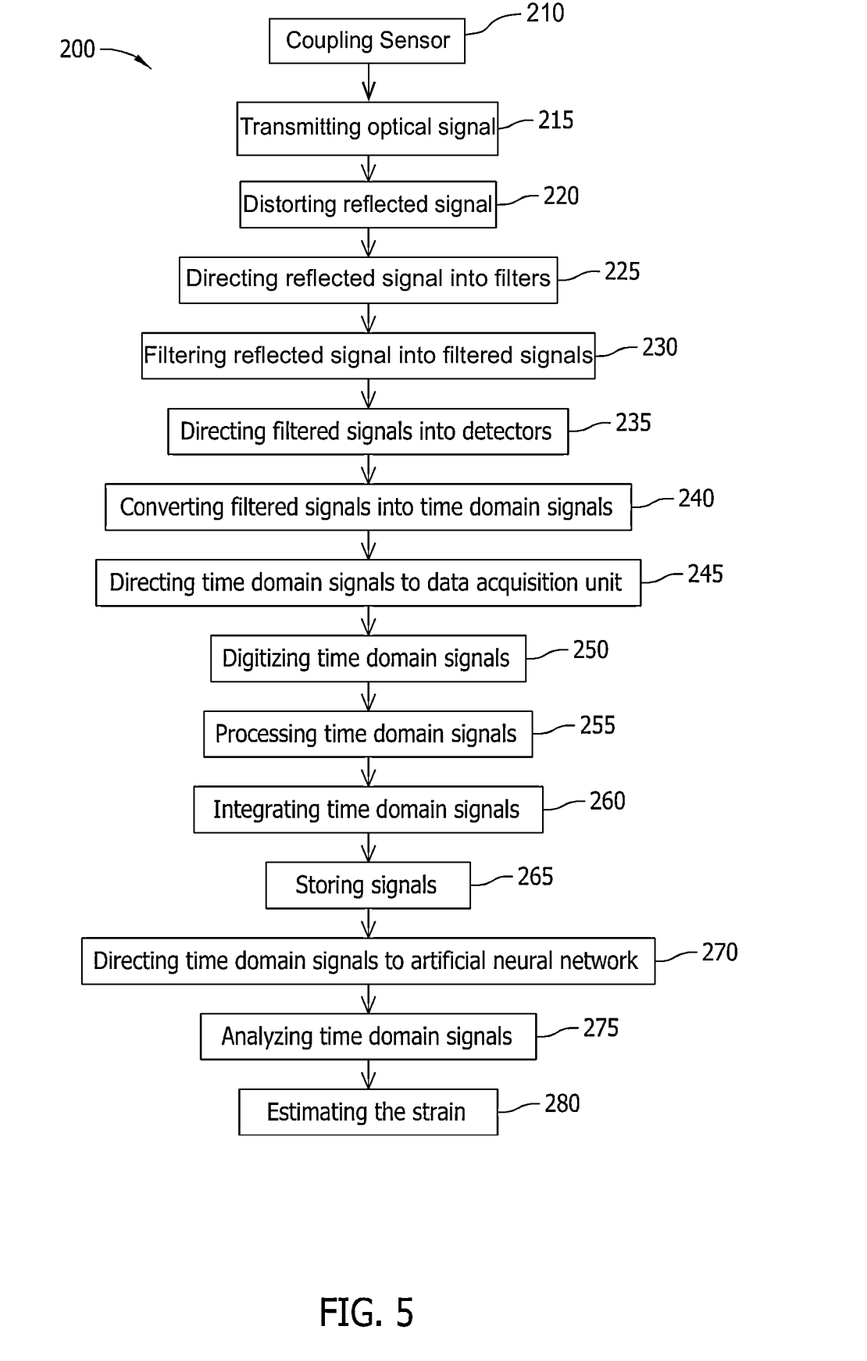
FIG. 5 illustrates a flow chart of an exemplary method that may be implemented to operate an exemplary monitoring system.

FIG. 5 illustrates a flow chart of a method 200 of operating a monitoring system, for example monitoring system 12 (shown in FIG. 2) to facilitate estimating strain of a component, for example component 16 (shown in FIG. 2). Method 200 includes coupling 210 a sensor, such as fiber Bragg grating sensor 10 (shown in FIG. 2), to component. In the exemplary embodiment, sensor is embedded within component. Alternatively, sensor may be coupled to component surface. A signal generator, for example laser generator 22 (shown in FIG. 2), transmits 215 an optical signal, such as signal 36 (shown in FIG. 2), into sensor. Sensor 10 converts the transmitted optical signal into a reflected signal, such as reflected signal 40 (shown in FIG. 2). At least one wavelength of reflected signal is shifted and/or distorted 220 based on strain applied to component. Method 200 includes directing 225 the reflected signal into a plurality of filters, for example fiber Bragg grating filters 50, 52, and 54 (shown in FIG. 2).

In the exemplary embodiment, filters filter 230 the reflective signal into a plurality of filtered signals, for example filtered signals 62, 66, and 70 (shown in FIG. 2). Method 200 includes directing 235 the plurality of filtered signals into a plurality of photo-detectors such as photo-detectors 56, 58, and 60 (shown in FIG. 2). Photo-detectors convert 240 the plurality of filtered signals into a plurality of time domain signals, for example time domain signals 64, 68, and 72 (shown in FIG. 2). Method 200 includes directing 245 the time domain signals to a data acquisition unit, for example data acquisition unit 28 (shown in FIG. 2).

Data acquisition unit receives time domain signals from detectors, wherein data acquisition unit digitizes 250 the received time domain signals. Data acquisition unit processes 255 the digitized time domain signal based on at least one algorithm executed by data acquisition unit. Method 200 includes data acquisition unit integrating 260 the time domain signals. The data acquisition unit stores 265 the digitized and processed signals for later use.

Method 200 includes directing 270 the time domain signals to an artificial neural network, for example artificial neural network 30 (shown in FIG. 2). Artificial neural network processes and analyzes the time domain signals according to associated diagnostic and/or prognostic application programs executed by the artificial neural network. Method 200 further includes analyzing 275 the time domain signals to facilitate estimating 280 the strain of the component.

Figure 6:
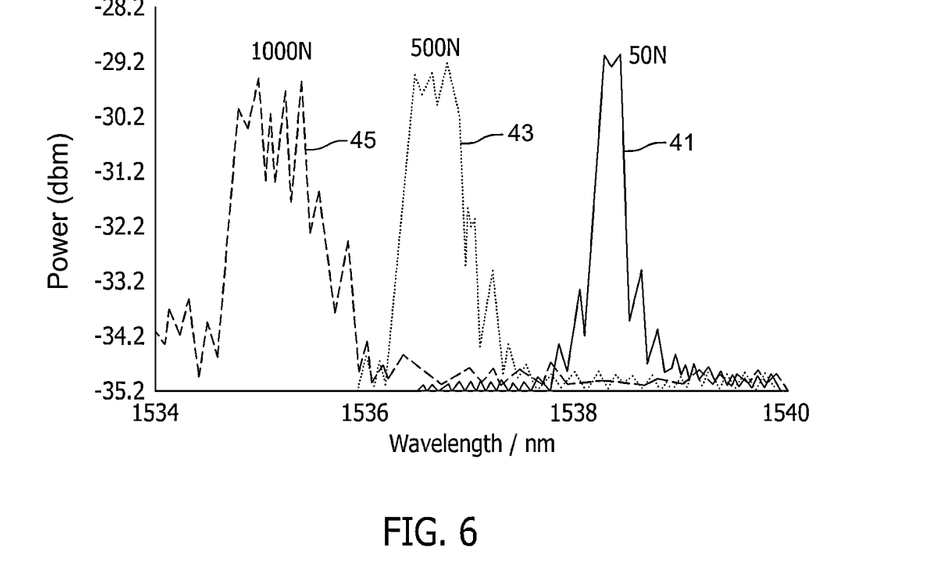
FIG. 6 illustrates an exemplary graphical representation of distorted sensor spectrums under exemplary strains measured by the sensor shown in FIG. 2.

FIGS. 6-13 illustrate graphical representation of an exemplary load applied to component 16 (shown in FIG. 2) and data compiled by monitoring system 12 (shown in FIG. 2) to estimate strain 20 applied to component 16. FIG. 6 illustrates an exemplary graphical representation of distorted sensor spectrum resulting from exemplary strain 20 applied to sensor 10. More particularly, FIG. 6 illustrates exemplary power distortions (graphically illustrated as 41, 43 and 45 in FIG. 6) observed in the spectrums resulting from strain 20 induced by three respective, exemplary loading levels—50N, 500N and 1 kN. In the exemplar embodiment, component 16 is loaded in four points in steps of 25N up to 1000N maximum load. Subsequently, the readings from data acquisition unit 28 were recorded at each loading steps. As illustrated, reflected signal 40 distorts with the resultant strain 20.

Figure 7:
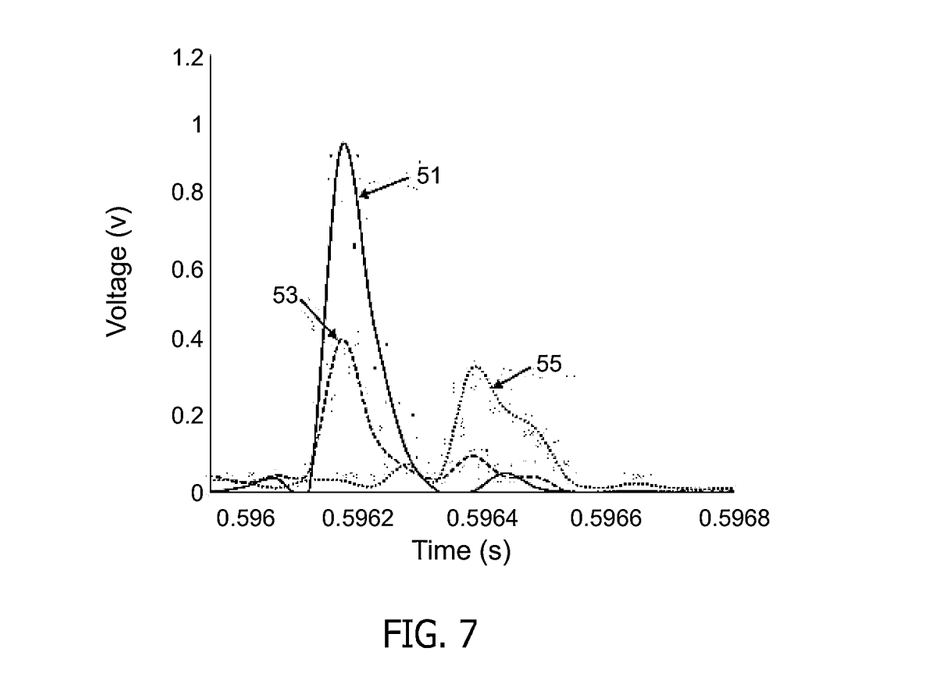
FIG. 7 illustrates an exemplary graphical representation of data for one of loads shown in FIG. 6.
Figure 8:
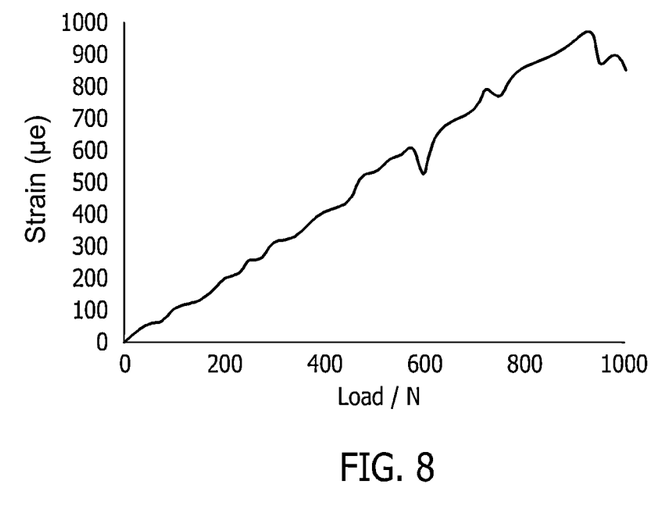
FIG. 8 illustrates an exemplary graphical representation of strain variations of the sensor shown in FIG. 2.

FIG. 7 illustrates an exemplary graphical representation of data for the exemplary strain 20 illustrated in FIG. 6. More particularly, FIG. 7 illustrates a plot of data recorded at an applied load of 725N with exemplary voltage responses (graphically illustrated as 51, 53 and 55 in FIG. 6) of respective detectors 56, 58, and 60 at the applied load of 725N. FIG. 8 illustrates an exemplary graphical representation of strain variations of sensor 10. More particularly, FIG. 8 illustrates strain 20 calculated using the highest peak value of the distorted reflected signal 40. Non-linearity of the readings is caused by the distortions, wherein with the observed distorted peaks, the calculated strain is not accurate.

In the exemplary embodiment, a detailed finite element model is configured for component 16 using programs such as, but not limited to, STRAND7 software. The model was loaded similar to the four point load applied to component 16. This finite element analysis data is configured to generate the initial training data for the sensor location in artificial neural network 30 and to verify output results of artificial neural network 30.

Figure 9:
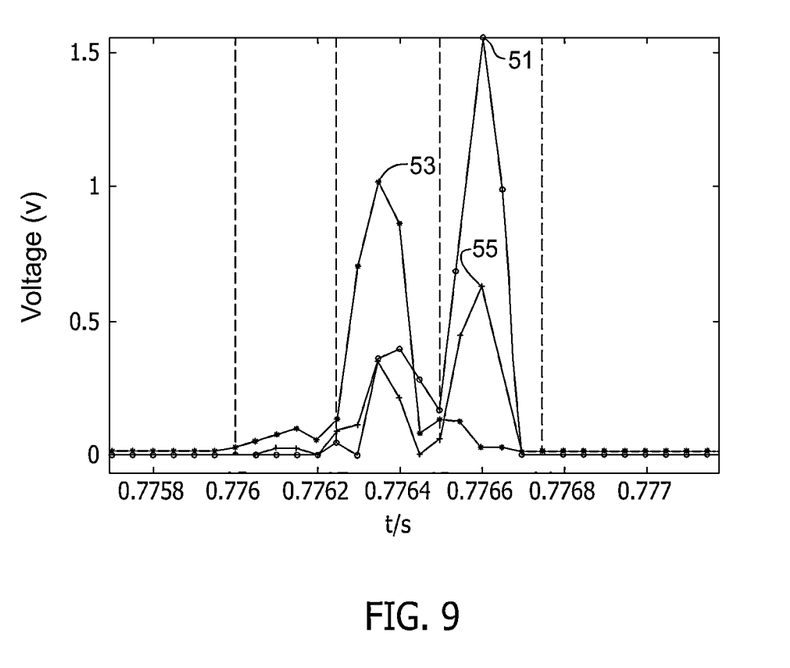
FIG. 9 illustrates an exemplary graphical representation of data extracted for exemplary strains measured by the sensor shown in FIG. 2.

In the exemplary embodiment, the recorded detector readings are pre-processed using an algorithm written on a program such as MATLAB to read the time domain spectrum. Weighted, pre-processed data is subsequently fed into artificial neural network 30 through three input neurons 100. FIG. 9 illustrates an exemplary graphical representation of data extracted from reflected signal 40 for strain 20 of component 16. More particularly, FIG. 9 shows exemplary voltage 51, 53 and 55 readings observed by respective detectors 56, 58, 60 while a 1000 N load is applied to component 16.

Figure 10:
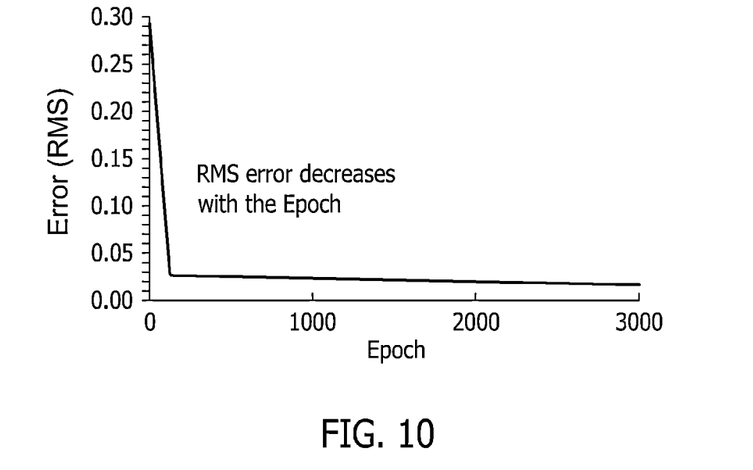
FIG. 10 illustrates an exemplary graphical representation of an exemplary training rate for the monitoring system shown in FIG. 2.

Artificial neural network 30 is trained to use the data set until the RMS error of artificial neural network output is reduced, in the exemplary embodiment, to about 0.3%. In the exemplary embodiment, artificial neural network 30 took 35,000 epochs to reach the expected RMS error level. FIG. 10 illustrates an exemplary graphical representation of a training rate of artificial neural network 30.

Figure 11:
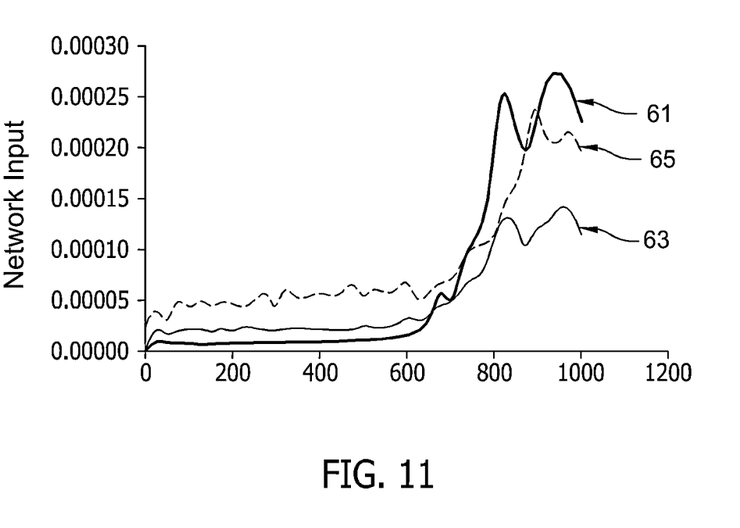
FIG. 11 illustrates an exemplary graphical representation of exemplary outputs for various measured strains.
Figure 12:
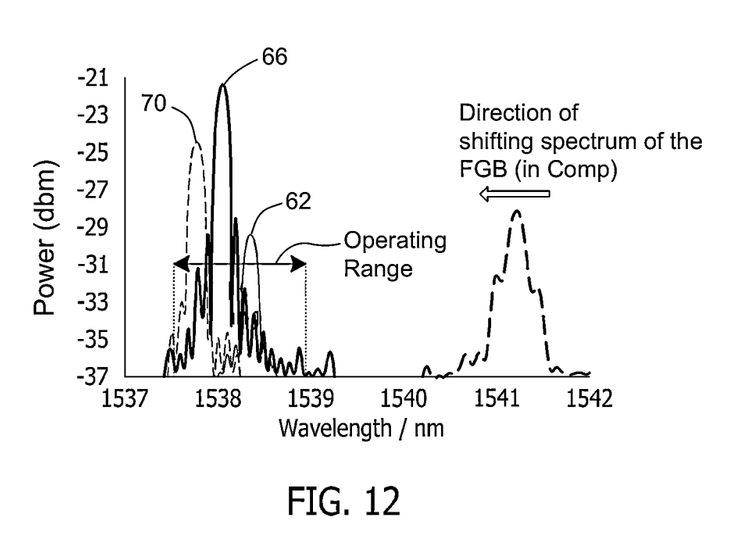
FIG. 12 illustrates an exemplary graphical representation of exemplary sensor spectrum for the sensor shown in FIG. 2.

FIG. 11 illustrates an exemplary graphical representation of exemplary strains 20. More particularly, FIG. 11 illustrates network input data (graphically illustrated as 61, 63 and 65) configured to train artificial neural network 30. The non-linearity of the data is caused by the spectrum distortions shown in FIG. 6. As illustrated in FIG. 12, the embedded fiber Bragg grating sensor peak's location with no loading is (1541 nm), 3 nm away from first filtered signal 62 of first filter 50 (1538 nm). With loading, the sensor peak starts to shift towards the bandwidth of the filters (1539 nm-1537.5 nm) (graphically illustrated as signals 66 and 70 for respective first and second filters 52 and 54. FIG. 11 illustrates an exemplary operating range of monitoring system 12. By selecting desired filters, monitoring system 12 is configured to work in any of the regions of the operating range of sensor 10. By increasing the number of filters 24, monitoring system 12 is configured to increase the monitored strain range of monitoring system 12. Moreover, by optimizing the filter bandwidth, monitoring system 12 is configured to minimize and/or eliminate the non-intersected regions and improve the learning rates of artificial neural network 30.

Figure 13:
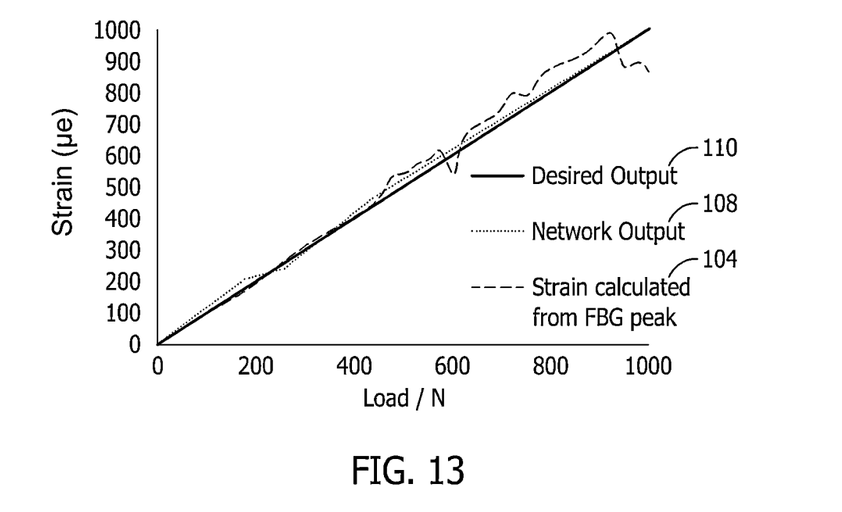
FIG. 13 illustrates an exemplary graphical output generated by the monitoring system shown in FIG. 2.

FIG. 13 illustrates an exemplary graphical output generated by monitoring system 12. More particularly, FIG. 13 illustrates a network output 108 and a desired output 110. In the exemplary embodiment, desired output 110 is the finite element analysis estimated strain at the sensor location within component 16. In the exemplary embodiment, network output 108 closely matches with desired output values. An initial mismatch was found due to values recorded out of the filters operating range. Hence, the percentage error for the strain from artificial neural network 30 at 250 N is higher than strain calculated from the fiber Bragg grating peak 104 as shown in the Table 1 (7.4628%).

As illustrated in FIG. 13, the response spectrum of sensor 10 has been significantly distorted under higher strains, but artificial neural network 30 is configured to estimate strain 20 with high accuracy illustrating its ability to accommodate the distorted signal as shown in Table 1. Moreover, as illustrated in FIG. 13, the overall prediction of artificial neural network 30 is in alignment with calculated strains. The maximum peak values show a considerable variation with the desired strains, thus disqualifying its use it as a reliable measure. Table 1 shows the error which was calculated relative to the desired value as:

TABLE 1

$$\text{Percentage Error} = \frac{(\text{Desired value} - \text{Strain from FBG peak or ANN})}{\text{Desired Value}} \%$$

| Load/N | Percentage Error | |
|---|---|---|
| | Strain calculated from FBG peak | ANN |
| 50 | −5.3421 | 0.3463 |
| 250 | −1.0045 | 7.4628 |
| 500 | −6.2716 | 0.1315 |
| 750 | −3.6897 | 0.0029 |
| 1000 | 16.1156 | 0.0636 |

For the embodiments described herein, a spectrum of a Bragg grating sensor, which is highly distorted as a function of increased load, has been decoded with an artificial neural network and the strain in the loaded component is determined. In one embodiment, the artificial neural network produced an error level less than 0.3% compared with strain values calculated using a conventional finite element analysis. The agreement of predictions of artificial neural network and the calculated strains confirms that the developed artificial neural network accommodates the inherent distortions of the spectra induced by other factors besides damage. Further, the system is capable of understanding an abnormal event such as, but not limited to, a surge of strain due to damages inside the component under four point bending loading. Additionally, the trained system acts as a reference for the particular component's strain response under four point loading.

The embodiments described herein eliminate the optical spectrum analyzer from the strain measurement system and replace it with the invention described herein to minimize and/or eliminate lengthy post-processing of data and bulky equipment. Moreover, the embodiments described herein employ artificial neural networks to facilitate minimizing and/or eliminating ambiguity and subjectivity in the classification of damage to the structural component. The embodiments described herein include the artificial neural network to model non-linear characteristics of physical components while being robust to noise. Further, the embodiments described herein minimize and/or eliminate the unnecessary data which was not caused by the damage inside the structural component. The embodiments described reduce the processing time to a level compatible with real-time sensing of strain, reduces the cost of implementation, and enhances the robustness/reliability of the system. Moreover, this approach improves the probability of correctly identifying and/or categorizing damage in the structural component.

The measurement subsystem may demodulate a spectral shift in the reflected optical signal for purposes of measurement (e.g., strain measurement) by using, for example, multiple channels for processing a reflected optical signal to overcome limitations (e.g., noise) within the analysis system.

Exemplary embodiments of systems and methods for a monitoring system are described above in detail. The systems and methods are not limited to the specific embodiments described herein, but rather, components of systems and/or steps of the method may be utilized independently and separately from other components and/or steps described herein. The disclosed dimensional ranges include all sub ranges there between. Further, components of the monitoring system may be fabricated from any material that enables the system to function as described herein. Each component and each method step may also be used in combination with other components and/or method steps.

Although specific features of various embodiments may be shown in some drawings and not in others, this is for convenience only. Any feature of a drawing may be referenced and/or claimed in combination with any feature of any other drawing. The embodiment described herein may include, an automotive vehicle, an aircraft vehicle, or a civil engineering structure. For example, if the monitoring system is deployed in a civil application, the optical sensor may be attached underneath a bridge or to a beam in a building. The analysis system may be used to monitor health of the structure to determine whether, for example, the structure is in danger of buckling or collapsing. The monitoring system may be used to monitor strain, movement, integrity, and the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for estimating strain of a component, said system comprising:
   a signal generator configured to transmit a signal toward the component;
   a sensor coupled to the component and configured to receive said signal and to generate a reflected signal;
   a fiber Bragg grating filter coupled to said sensor and configured to filter said reflected signal and to generate a filtered signal;
   a detector coupled to said filter and configured to convert said filtered signal to a time domain signal;

a data acquisition unit coupled to said detector and configured to compile the time domain signal received from said detector by digitizing and integrating the time domain signal; and an artificial neural network coupled to said data acquisition unit and configured to process said compiled time domain signal to facilitate estimating the strain of the component, said artificial neural network configured to process said compiled time domain signal using a prognostics algorithm that predicts a future condition of the component.

2. The system of claim 1 wherein said signal generator comprises a laser.

3. The system of claim 2 wherein said signal comprises an optical signal.

4. The system of claim 1 wherein said sensor is embedded within the component.

5. The system of claim 1 wherein at least one of said reflected signal is distorted based on the strain of the component.

6. The system of claim 1 wherein said sensor comprises a fiber Bragg grating sensor.

7. The system of claim 1 wherein said artificial neural network comprises a power-time integration algorithm.

8. The system of claim 1 wherein said detector comprises a photo-detector.

9. The system of claim 8 further comprising a fiber optic coupler configured to transmit photonic energy from said fiber Bragg grating filter to said photo detector.

10. A method of estimating a strain of a component, said method comprising:
- transmitting an optical signal from a laser and into a fiber Bragg grating sensor;
- converting the transmitted optical signal into a reflected signal;
- directing the reflected signal into a plurality of fiber Bragg grating filters;
- filtering the reflected signal into a plurality of filtered signals;
- directing the plurality of filtered signals into a plurality of photo-detectors;
- converting the plurality of filtered signals into a plurality of time domain signals;
- compiling the plurality of time domain signals by digitizing and integrating the plurality of time domain signals using a data acquisition system coupled between the plurality of photo-detectors and an artificial neural network;
- directing the compiled time domain signals into the artificial neural network; and
- analyzing the compiled time domain signals using a prognostics algorithm that predicts a future condition of the component to facilitate estimating the strain of the component.

11. The method of claim 10 further comprising distorting at least one of the reflected signal based on the strain of the component.

12. The method of claim 10 wherein the plurality of filters comprises a first filter, a second filter and a third filter which are configured to filter the reflected signal into a first filter signal, a second filter signal and a third filter signal respectively.

13. The method of claim 12 wherein the plurality of detectors comprises a first detector, a second detector and a third detector which are configured to convert the first, second and third filtered signals into a first time domain signal, a second time domain signal and a third time domain signal respectively.

14. The method of claim 13 further comprising integrating the first, second and third time domain signals.

15. The method of claim 14 further comprising calculating a strain output value based on the estimated strain of the component.

16. A vehicle monitoring system for monitoring a condition of a composite component of a vehicle, said system comprising:
- a laser configured to transmit an optical signal toward the composite component;
- a fiber Bragg grating sensor coupled to the composite component and configured to receive said optical signal and to generate a reflected signal;
- a fiber Bragg grating filter coupled to said sensor and configured to filter said reflected signal and to generate a filtered signal;
- a photo-detector coupled to said filter and configured to convert said filtered signal into a time domain signal;
- a data acquisition unit coupled to said photo-detector and configured to compile said time domain signal received from said photo-detector by digitizing and integrating said time domain signal; and
- an artificial neural network coupled to said data acquisition unit and configured to correlate said compiled time domain signal using a prognostics algorithm that predicts a future condition of the composite component to facilitate estimating the strain of the composite component.

17. The vehicle monitoring system of claim 16 wherein said fiber Bragg filter comprises a plurality of fiber Bragg filters 18. The vehicle monitoring system of claim 16 wherein said artificial neural network includes a plurality of inputs and an output neuron.

19. The vehicle monitoring system of claim 16 wherein each input includes a plurality of input neurons.

* * * * *